US012803451B2

(12) United States Patent
Shen et al.

(10) Patent No.: US 12,803,451 B2
(45) Date of Patent: Nov. 17, 2026

(54) CONTROLLER FOR USE IN ASYMMETRICAL HALF-BRIDGE CONVERTER AND OPERATION METHOD THEREOF

(71) Applicant: ARK HDPS SEMICONDUCTOR PTE. LIMITED., Singapore (SG)

(72) Inventors: Yi-Lun Shen, Taipei City (TW); Yu-Yun Huang, Taipei City (TW)

(73) Assignee: Ark HDPS Semiconductor Pte. LIMITED., Singapore (SG)

( * ) Notice: Subject to any disclaimer, the term of this patent is extended or adjusted under 35 U.S.C. 154(b) by 243 days.

(21) Appl. No.: 18/597,951

(22) Filed: Mar. 7, 2024

(65) Prior Publication Data

US 2024/0313659 A1 Sep. 19, 2024

(30) Foreign Application Priority Data

Mar. 13, 2023 (CN) ......................... 202310260695.6

(51) Int. Cl.

| | |
|---|---|
| ***H02M 3/335*** | (2006.01) |
| ***H02M 1/00*** | (2007.01) |
| ***H02M 1/36*** | (2007.01) |
| ***H02M 3/00*** | (2006.01) |

(52) U.S. Cl.

CPC ..... *H02M 3/33571* (2021.05); *H02M 1/0032* (2021.05); *H02M 1/0058* (2021.05); *H02M 3/01* (2021.05); *H02M 1/36* (2013.01)

(58) Field of Classification Search

CPC ............... H02M 3/33571; H02M 3/01; H02M 3/33569; H02M 1/0032; H02M 1/0035

See application file for complete search history.

(56) References Cited

U.S. PATENT DOCUMENTS

| | | | |
|---|---|---|---|
| 10,892,687 | B2 | 1/2021 | Fahlenkamp |
| 2014/0254204 | A1 | 9/2014 | Kao |

(Continued)

FOREIGN PATENT DOCUMENTS

| | | | |
|---|---|---|---|
| CN | 101882875 | A | 11/2010 |
| CN | 104779806 | A | 7/2015 |

(Continued)

OTHER PUBLICATIONS

Shen, the specification, including the claims, and drawings in the U.S. Appl. No. 18/603,179 , Filing Date: Mar. 12, 2024.

*Primary Examiner* — Gustavo A Rosario-Benitez

(74) *Attorney, Agent, or Firm* — Winston Hsu

(57) ABSTRACT

An asymmetrical half-bridge converter has an auxiliary winding, a main switch and a resonant switch. The auxiliary winding generates a feedback voltage. A controller turns on the main switch for a first ON duration, turns off the main switch and the resonant switch for a first OFF duration after the first ON duration, turns on the resonant switch for a second ON duration after the first OFF duration, turns off the main switch and the resonant switch for a second OFF duration after the second ON duration, turns on the resonant switch for a third ON duration after the second OFF duration, and turns off the main switch and the resonant switch for a third OFF duration after the third ON duration. The length of the second ON duration is a fixed ratio of a discharge period, and the fixed ratio is less than 1.

18 Claims, 7 Drawing Sheets

(56) References Cited

U.S. PATENT DOCUMENTS

| | | | | |
|---|---|---|---|---|
| 2015/0263629 | A1* | 9/2015 | Stuler | H02M 3/33546 363/21.02 |
| 2016/0020699 | A1* | 1/2016 | Shen | H02M 3/33507 363/15 |
| 2021/0242789 | A1* | 8/2021 | Su | H02M 1/0025 |
| 2021/0408921 | A1* | 12/2021 | Yang | H02M 1/38 |
| 2022/0271675 | A1* | 8/2022 | Yang | H02M 1/0058 |
| 2022/0271676 | A1* | 8/2022 | Yang | H02M 3/33523 |
| 2022/0294358 | A1 | 9/2022 | Wang | |
| 2022/0416644 | A1 | 12/2022 | Xu | |
| 2023/0020390 | A1 | 1/2023 | Wang | |
| 2024/0275275 | A1* | 8/2024 | Yang | H02M 1/0009 |
| 2024/0305207 | A1* | 9/2024 | Liu | H02M 1/0058 |
| 2025/0096690 | A1 | 3/2025 | Sun | |

FOREIGN PATENT DOCUMENTS

| | | | |
|---|---|---|---|
| CN | 105375783 | A | 3/2016 |
| CN | 104779806 | B | 11/2017 |
| CN | 110224612 | | 9/2019 |
| CN | 111010036 | A | 4/2020 |
| CN | 113937988 | | 1/2022 |
| CN | 216699838 | U | 6/2022 |
| CN | 115037159 | | 9/2022 |
| CN | 115118174 | A | 9/2022 |
| CN | 217508617 | U | 9/2022 |
| CN | 115549478 | | 12/2022 |
| TW | 200529541 | | 9/2005 |
| TW | 200529544 | | 9/2005 |
| TW | M457354 | U1 | 7/2013 |
| TW | 201433064 | A | 8/2014 |
| TW | I514740 | B | 12/2015 |
| TW | I514742 | B | 12/2015 |
| TW | I627825 | B | 6/2018 |
| TW | 202135442 | A | 9/2021 |
| TW | 202135452 | A | 9/2021 |
| TW | 202308282 | A | 2/2023 |
| WO | 2016/033112 | A1 | 3/2016 |
| WO | 2020/248472 | A1 | 12/2020 |

* cited by examiner

CONTROLLER FOR USE IN ASYMMETRICAL HALF-BRIDGE CONVERTER AND OPERATION METHOD THEREOF

BACKGROUND OF THE INVENTION

1. Field of the Invention

This invention relates to power conversion, particularly to a controller and an operating method for an asymmetrical half-bridge converter.

2. Description of the Prior Art

Power converters convert input voltages to output voltages to provide power suitable for various circuits. Asymmetric half-bridge (AHB) converters are a type of asymmetric converters with a transformer. They use two switches in a half-bridge configuration on the primary side. Asymmetric half-bridge converters are named because the two switches are driven by different pulse-width modulation (PWM) signals. They are characterized by their simple structure, low switching losses, and low electromagnetic interference (EMI).

One way to reduce switching losses in medium-loading or light-loading power converters is to increase the switching period duration, which means reducing the switching frequency. Patent application number CN101882875A in China and several other patent applications cited in its background technology teach various power supply devices that can adjust the switching frequency according to the load status. Thus, the power supply device can use appropriate modulation methods to reduce the switching frequency under light-loading and no-load conditions, increasing the switching period duration, reducing switching losses, and improving the output efficiency of the power supply.

In relevant technology, asymmetric half-bridge converters are too complicate to control and cannot provide high energy transfer efficiency and zero-voltage switching in both heavy-loading and light-loading conditions.

SUMMARY OF THE INVENTION

An embodiment of the invention provides a controller for an asymmetrical half-bridge converter with an auxiliary winding formed on a primary side of the asymmetrical half-bridge converter. The auxiliary winding generates a feedback voltage. The controller comprises a first switch driver, a second switch driver, and a control logic. The first switch driver is configured to drive a first switch of the asymmetrical half-bridge converter. The second switch driver is configured to drive a second switch of the asymmetrical half-bridge converter. The control logic is coupled to the first switch driver and the second switch driver. During a first switching period and a second switching period, the control logic is configured to control the first switch driver to turn on the first switch for a first ON duration; control the first switch driver and the second switch driver to turn off the first switch and the second switch for a first OFF duration after the first ON duration; control the second switch driver to turn on the second switch for a second ON duration after the first OFF duration; control the first switch driver and the second switch driver to turn off the first switch and the second switch for a second OFF duration after the second ON duration; control the second switch driver to turn on the second switch for a third ON duration after the second OFF duration; and control the first switch driver and the second switch driver to turn off the first switch and the second switch for a third OFF duration after the third ON duration. During the first switching period, the control logic determines a discharge period according to the feedback voltage. During the second switching period, the control logic adjusts a length of the second ON duration to a fixed ratio of the discharge period, the fixed ratio is less than 1.

Another embodiment of the invention further provides a controller for an asymmetrical half-bridge converter. The asymmetrical half-bridge converter comprises an auxiliary winding formed on a primary side of the asymmetrical half-bridge converter. The auxiliary winding generates a feedback voltage. The controller comprises a first switch driver, a second switch driver, and a control logic. The first switch driver is configured to drive a first switch of the asymmetrical half-bridge converter. The second switch driver is configured to drive a second switch of the asymmetrical half-bridge converter. The control logic is coupled to the first switch driver and the second switch driver. During a first switching period and a second switching period and when the asymmetrical half-bridge converter is in a light-loading mode, the control logic is configured to control the first switch driver to turn on the first switch for a first ON duration; control the first switch driver and the second switch driver to turn off the first switch and the second switch for a first OFF duration after the first ON duration; control the second switch driver to turn on the second switch for a second ON duration after the first OFF duration; control the first switch driver and the second switch driver to turn off the first switch and the second switch for a second OFF duration after the second ON duration; control the second switch driver to turn on the second switch for a third ON duration after the second OFF duration; and control the first switch driver and the second switch driver to turn off the first switch and the second switch for a third OFF duration after the third ON duration. The control logic is configured to terminate the second OFF duration and start the third ON duration when the feedback voltage approaches one of resonant peaks after an end the second ON duration.

Another embodiment of the invention further provides a method of operating an asymmetrical half-bridge converter. The asymmetrical half-bridge converter has an auxiliary winding formed on a primary side of the asymmetrical half-bridge converter. The auxiliary winding generates a feedback voltage. A first switch driver drives a first switch of the asymmetrical half-bridge converter, and a second switch driver drives a second switch of the asymmetrical half-bridge converter. The method comprises: during a first switching period and a second switching period, a control logic controlling the first switch driver to turn on the first switch for a first ON duration; controlling the first switch driver and the second switch driver to turn off the first switch and the second switch for a first OFF duration after the first ON duration; controlling the second switch driver to turn on the second switch for a second ON duration after the first OFF duration; controlling the first switch driver and the second switch driver to turn off the first switch and the second switch for a second OFF duration after the second ON duration; controlling the second switch driver to turn on the second switch for a third ON duration after the second OFF duration; and controlling the first switch driver and the second switch driver to turn off the first switch and the second switch for a third OFF duration after the third ON duration. The method further comprises determining a discharge period according to the feedback voltage during the first switching period; and adjusting a length of the second ON duration to a fixed ratio of the discharge period during the second switching period to make the duration of the second ON duration shorter than a duration of the discharge period.

Another embodiment of the invention further provides a method of operating a controller for an asymmetrical half-bridge converter. The asymmetrical half-bridge converter has an auxiliary winding formed on a primary side of the asymmetrical half-bridge converter. The auxiliary winding generates a feedback voltage. A first switch driver drives a first switch of the asymmetrical half-bridge converter, and a second switch driver drives a second switch of the asymmetrical half-bridge converter. The method comprises during a first switching period and a second ON duration during a second switching period and when the asymmetrical half-bridge converter is in a light-loading mode, controlling the first switch driver to turn on the first switch for a first ON duration; controlling the first switch driver and the second switch driver to turn off the first switch and the second switch for a first OFF duration after the first ON duration; controlling the second switch driver to turn on the second switch for a second ON duration after the first OFF duration; controlling the first switch driver and the second switch driver to turn off the first switch and the second switch for a second OFF duration after the second ON duration; controlling the second switch driver to turn on the second switch for a third ON duration after the first OFF duration; and controlling the first switch driver and the second switch driver to turn off the first switch and the second switch for a third OFF duration after the third ON duration. The method further comprises terminating the second OFF duration and starting the third ON duration when the feedback voltage approaches one of resonant peaks after the second ON duration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
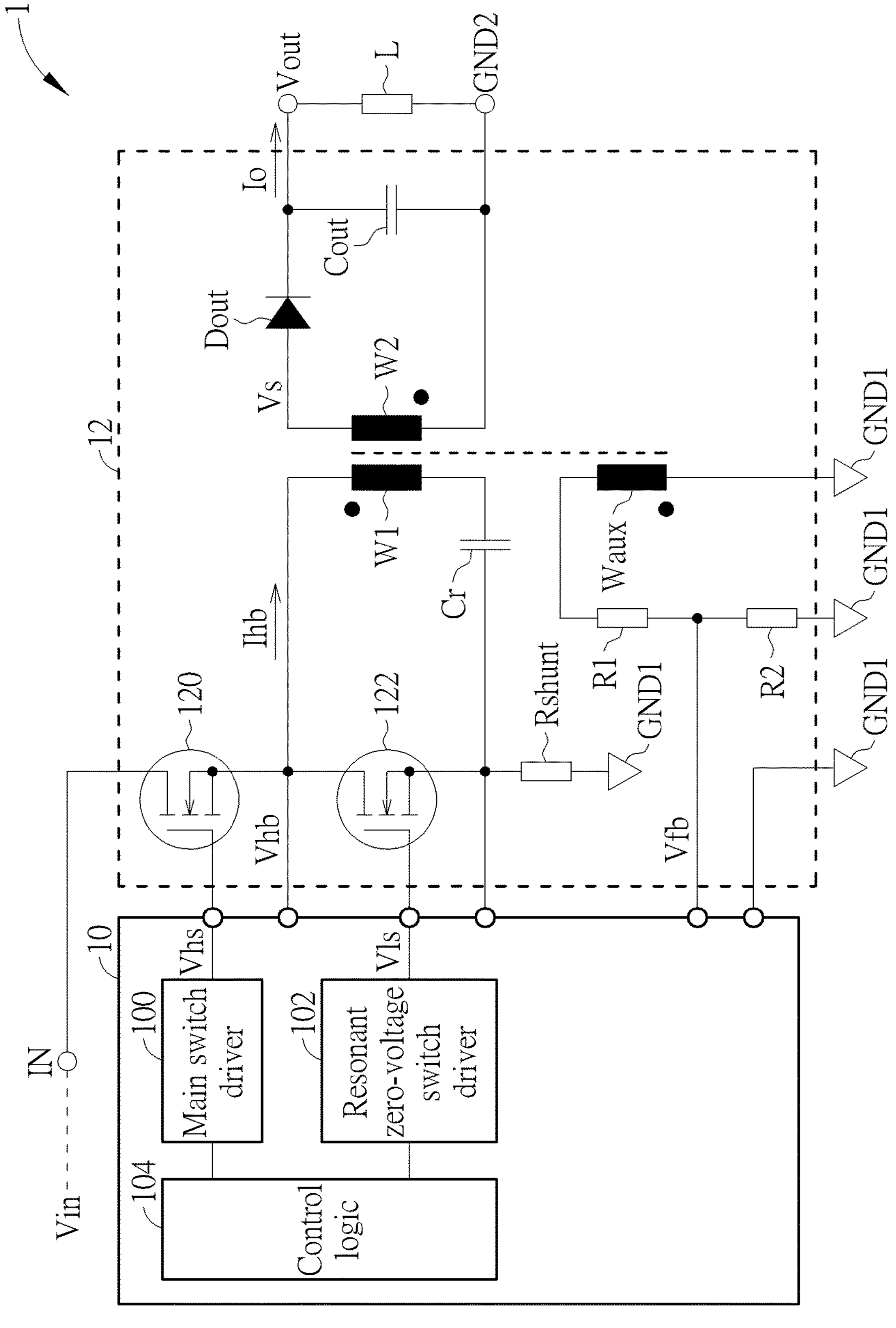
FIG. 1 is a schematic diagram of an asymmetric half-bridge converter system according to an embodiment of the present invention.

FIG. 1 is a schematic diagram of an asymmetric half-bridge (AHB) converter system 1 according to an embodiment of the present invention. The AHB converter system 1 converts an input voltage Vin to an output voltage Vout to power a load L. The input voltage Vin and the output voltage Vout may be direct-current (DC) voltages, and the output voltage Vout may be less than the input voltage Vin. For example, the input voltage Vin may be 20 volts (i.e., 20V), and the output voltage Vout may be 12 volts (i.e., 12V). In FIG. 1, the AHB converter system 1 comprises a controller 10 and an asymmetric half-bridge (AHB) converter 12 that are coupled to each other. The controller 10 controls the AHB converter 12 to achieve resonant energy transfer and zero-voltage switching (ZVS) in both heavy-loading and light-loading conditions.

The AHB converter 12 may comprise a main switch 120, a resonant zero-voltage switch 122, a primary winding W1, a secondary winding W2, an auxiliary winding Waux, a resonant capacitor Cr, a shunt resistor Rshunt, resistors R1 and R2, a diode Dout, and an output capacitor Cout. The main switch 120 has a control end, a first end, and a second end. The first end of the main switch 120 is coupled to an input end IN to receive the input voltage Vin. The resonant zero-voltage switch 122 has a control end, a first end, and a second end. The first end of the resonant zero-voltage switch 122 is coupled to the second end of the main switch 12. The primary winding W1 and the secondary winding W2 may form a transformer and have opposite polarities. The primary winding W1 and the auxiliary winding Waux may have opposite polarities. The primary winding W1 has a first end and a second end. The first end of the primary winding W1 is coupled to the second end of the main switch 120. The resonant capacitor Cr has a first end and a second end. The first end of the resonant capacitor Cr is coupled to the second end of the secondary winding W1. The shunt resistor Rshunt has a first end and a second end, which are respectively coupled to the second end of the resonant capacitor Cr and a ground end GND1. The auxiliary winding Waux may be formed on the primary side of the AHB converter 12 and have a first end and a second end. The second end of the auxiliary winding Waux is coupled to the ground end GND1. The resistor R1 has a first end and a second end, which are respectively coupled to the first end of the auxiliary winding Waux and a first end of the resistor R2. The resistor R2 has a first end and a second end, which are respectively coupled to the second end of the resistor R1 and the ground end GND1. A voltage divider formed by the resistor R1 and the resistor R2 is used to provide a feedback voltage Vfb. The secondary winding W2 has a first end and a second end. The first end of the secondary winding W2 is used to provide a voltage Vs. The diode Dout has an anode and a cathode. The anode of the diode Dout is coupled to the first end of the secondary winding W2. The output capacitor Cout has a first end and a second end, which are respectively coupled to the cathode of the diode Dout and a ground end GND2. The ground ends GND1 and GND2 may be isolated from each other and may provide a ground voltage, for example, 0V. The main switch 120 and the resonant zero-voltage switch 122 may be N-type metal-oxide-semiconductor field-effect transistors (MOSFETs). In some embodiments, the main switch 120 and the resonant zero-voltage switch 122 may also be other types of transistors. The diode Dout may also be replaced by a synchronous rectification switch and associated control circuitry.

Although in the embodiment of FIG. 1, the main switch 120 is a high-side switch and the resonant zero-voltage switch 122 is a low-side switch, the present invention is not limited to this. According to actual needs, the function and control method of the high-side switch and the low-side switch may be swapped, so that the low-side switch may be used as the main switch 120 and the high-side switch may be used as the resonant zero-voltage switch 122.

The voltage at a coupling node where the second end of the main switch 120, the first end of the resonant zero-voltage switch 122, and the first end of the primary winding W1 are mutually coupled is called a voltage Vhb. The current flowing through the primary winding W1 is called a current Ihb, and the current flowing through the primary winding W1 and related to the magnetic flux of the transformer is called a magnetizing current. The current Ihb is positive if the current Ihb flows from the coupling node to the primary winding W1; and the current Ihb is negative if the current Ihb flows from the primary winding W1 to the coupling node.

The main switch 120 and the resonant zero-voltage switch 122 are cascaded between the input end IN and the ground end GND1, forming a half-bridge circuit. In some embodiments, the main switch 120 may be coupled to a rectifier, which may receive an alternating current (AC) voltage and convert the AC voltage to the input voltage Vin. The main switch 120 and the resonant zero-voltage switch 122 will not be turned on at the same time. When the main switch 120 is turned on and the resonant zero-voltage switch 122 is turned off, the primary winding W1 may store energy due to the input voltage Vin. When the main switch 120 is turned off and the resonant zero-voltage switch 122 is turned on, the energy stored in the primary winding W1 and the resonant energy generated by a resonant circuit, which is formed by the primary winding W1 and the resonant capacitor Cr, will be transferred from the primary winding W1 to the secondary winding W2. The resistors R1 and R2 may form a voltage divider to divide the voltage at the first end of the auxiliary winding Waux to generate the feedback voltage Vfb. For example, if the resistances of the resistors R1 and R2 are equal, and the voltage at the first end of the auxiliary winding Waux is 20V, the feedback voltage Vfb may be 10V. The output capacitor Cout may act as a filter to stabilize the output voltage Vout.

The controller 10 may comprise a main switch driver 100, a resonant zero-voltage switch driver 102, and a control logic 104. The main switch driver 100 is coupled to the control end of the main switch 120 to output a control signal Vhs to drive the main switch 120. The resonant zero-voltage switch driver 102 is coupled to the control end of the resonant zero-voltage switch 122 to output a control signal Vls to drive the resonant zero-voltage switch 122. The control logic 104 is coupled to the main switch driver 100 and the resonant zero-voltage switch driver 102. In each switching period of the AHB converter system 1, the control logic 104 may: (1) control the main switch driver 100 to output a control signal Vhs having one main pulse, so as to store energy in the primary winding W1 and regulate the output voltage Vout to a fixed level (e.g., 12V) or a fixed range (e.g., 12V±10%), and (2) control the resonant zero-voltage switch driver 102 in two ways: (2a) in a light-loading condition, to output a control signal Vls having both a first pulse and a second pulse, and (2b) in a heavy-loading condition, to output a control signal Vls having at least the first pulse, so as to facilitate resonant energy transfer and zero-voltage switching in both the light-loading condition and the heavy-loading condition.

Figure 2:
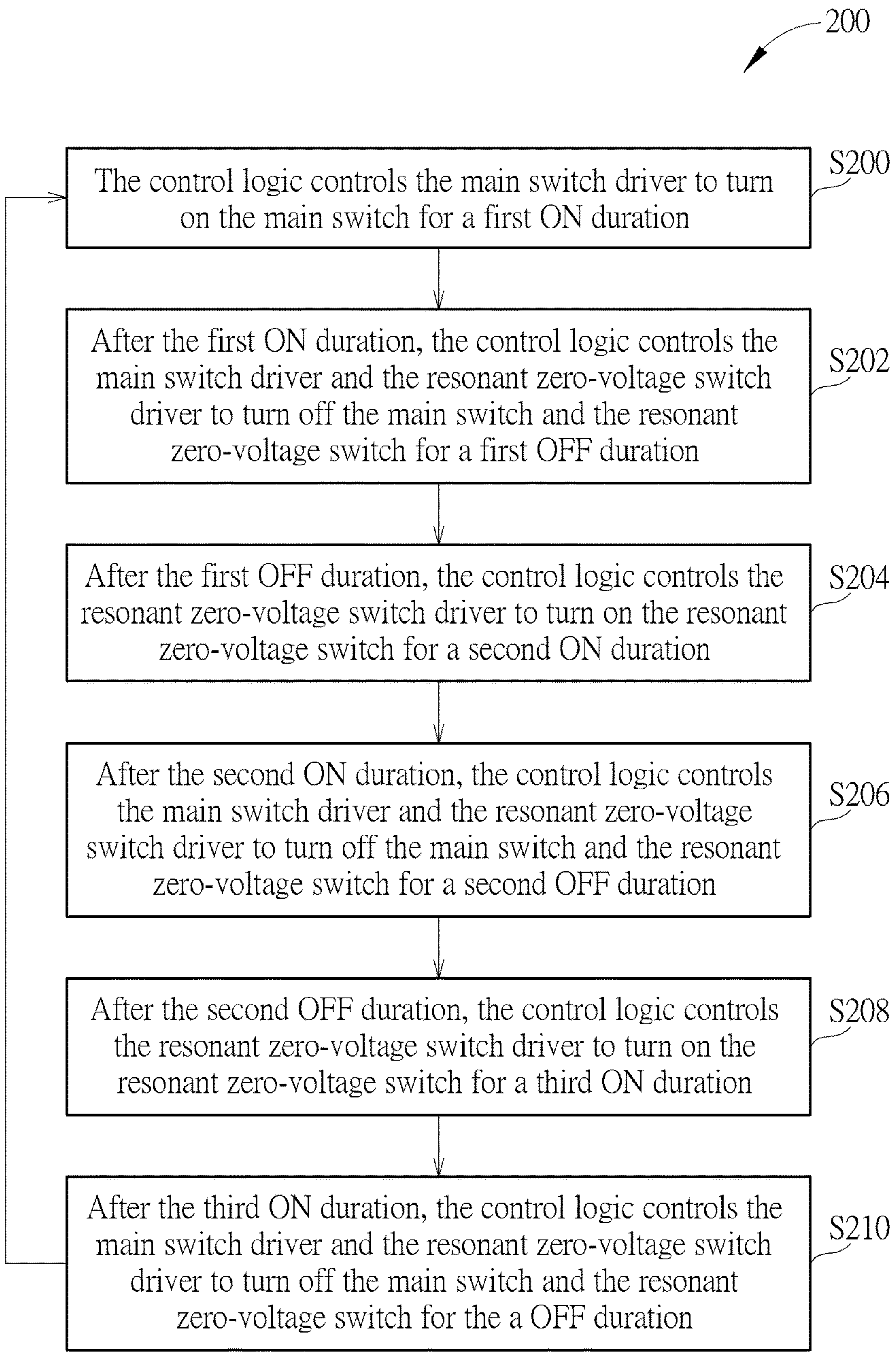
FIG. 2 is a flow chart of a method for operating the controller in FIG. 1.
Figure 3:
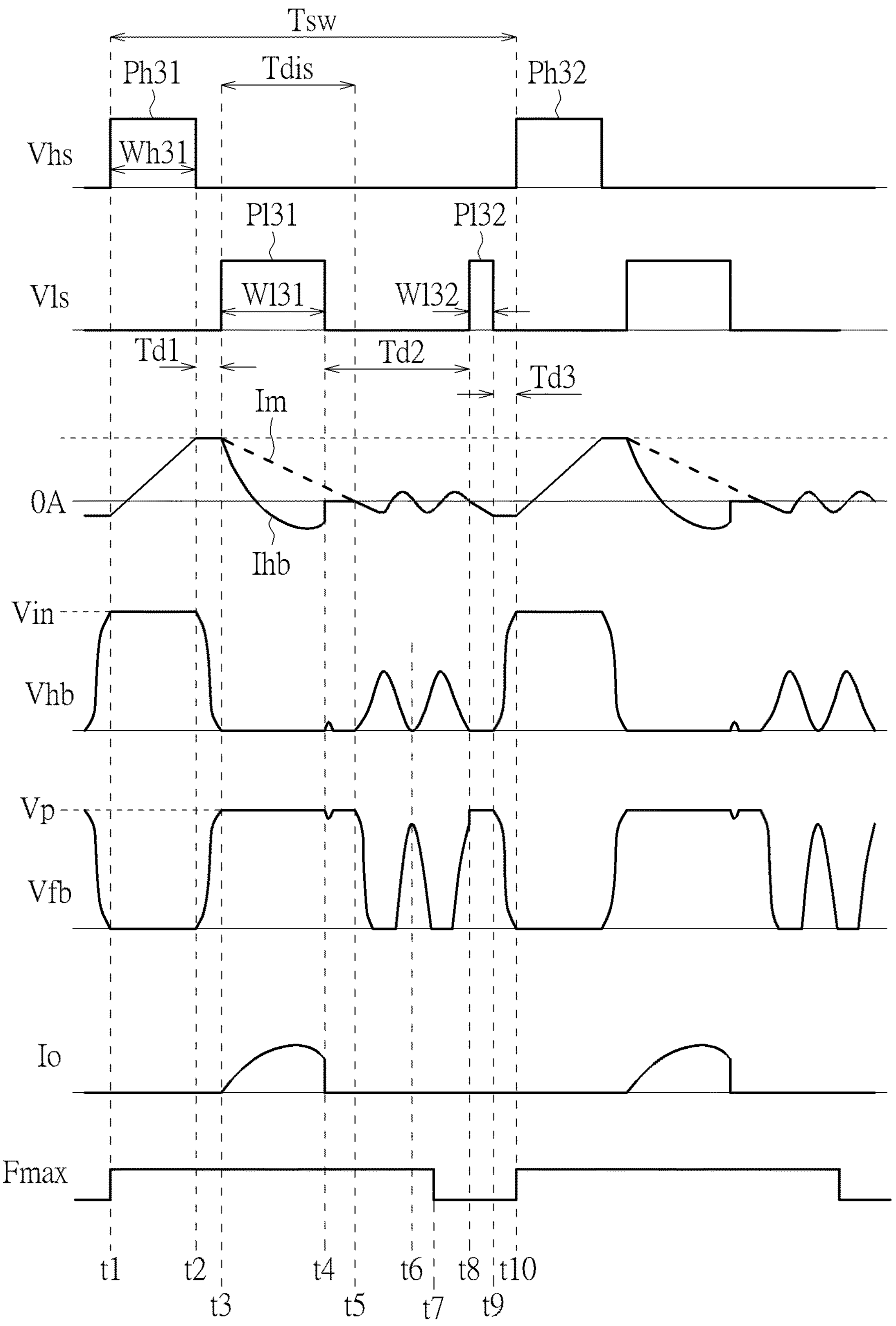
FIG. 3 is a waveform diagram of the asymmetric half-bridge converter system in FIG. 1 under a light-loading condition.

In light-loading conditions, the AHB converter system 1 can provide less power to the load L, the operating frequency is lower, and the corresponding switching period duration is longer. In a heavy-loading condition, the AHB converter system 1 can provide more power to the load L, the operating frequency is higher, and the corresponding switching period duration is shorter. The embodiments of FIG. 2 and FIG. 3 are used to illustrate an operation method 200 of the controller 10 in light-loading conditions. The embodiments of FIG. 4 to FIG. 7 are used to illustrate an operation method 400 and an operation method 600 of the controller 10 in heavy-loading conditions.

FIG. 2 is a flow chart of an operation method 200 of the controller 10, suitable for light-loading conditions. The operation method 200 includes steps S200 to S210 used to form the switching period of the AHB converter 12. Steps S200 and S202 are used to generate a main pulse, steps S204 and S206 are used to generate a first pulse, and steps S208 and S210 are used to generate a second pulse. Any reasonable technical modifications or adjustments to the steps fall within the scope disclosed by the invention. The explanations for steps S200 to S210 are as follows:

Step S200: The control logic 104 controls the main switch driver 100 to turn on the main switch 120 for a first ON duration;

Step S202: After the first ON duration, the control logic 104 controls the main switch driver 100 and the resonant zero-voltage switch driver 102 to turn off the main switch 120 and the resonant zero-voltage switch 122 for a first OFF duration Td1. The first OFF duration Td1 helps to avoid the risk of the main switch 120 and the resonant zero-voltage switch 122 being turned on accidentally at the same time, which may lead to an explosion due to the near short circuit between the input end IN and the ground end GND1;

Step S204: After the first OFF duration Td1, the control logic 104 controls the resonant zero-voltage switch driver 102 to turn on the resonant zero-voltage switch 122 for a second ON duration. The control logic 104 may determine the length of the second ON duration of the current switching period based on a discharge period Tdis period in the previous switching period. For example, the length of the second ON duration in the current switching period is a fixed proportion of 0.8 of the discharge period Tdis in the previous switching period. The second ON duration is started when the resonant zero-voltage switch 122 is turned on, and the resonant zero-voltage switch 122 is turned off. A second OFF duration Td2 is started when the second ON duration reaches the length determined by the control logic 104;

Step S206: After the second ON duration, the control logic 104 controls the main switch driver 100 and the resonant zero-voltage switch driver 102 to turn off the main switch 120 and the resonant zero-voltage switch 122 for the second OFF duration Td2. The second OFF duration Td2 ends at the time point of a resonant peak of the feedback voltage Vfb following an end of a switching period duration Fmax;

Step S208: After the second OFF duration Td2, the control logic 104 controls the resonant zero-voltage switch driver 102 to turn on the resonant zero-voltage switch 122 for a third ON duration;

Step S210: After the third ON duration, the control logic 104 controls the main switch driver 100 and the resonant zero-voltage switch driver 102 to turn off the main switch 120 and the resonant zero-voltage switch 122 for a third OFF duration Td3; then return to step S200.

In step S200, the first ON duration may be equal to the pulse width of the main pulse, such as the pulse width Wh31 of the main pulse Ph31 in FIG. 3. The main switch driver 100 may adjust the first ON duration according to the ratio of the required output voltage Vout to the current input voltage Vin. The larger the required output voltage Vout, the longer the first ON duration.

In step S204, the second ON duration can be equal to the pulse width of the first pulse, such as the pulse width Wl31 of a first pulse Pl31 in FIG. 3. During the second ON duration, the primary winding W1 and the resonant capacitor Cr can generate LC resonance, causing the current Ihb to resonate according to the resonant frequency. In some embodiments, during an earlier first switching period, the control logic 104 can determine the discharge period Tdis within the first switching period based on the knee point of the feedback voltage Vfb. Then, during a later second switching period, the control logic 104 can adjust the length of the second ON duration Wl31 to be equal to a fixed ratio of the discharge period of the earlier first switching period. The fixed ratio can be less than 1. In some embodiments, the fixed ratio can be between 0.75 and 0.95, (1) to transfer most of the resonant energy to the secondary side, and (2) to turn off the resonant zero voltage switch 122 before a possible end of the discharge period Tdis of the second switching period, so that the knee point of the feedback voltage Vfb triggered by the end of the discharge period Tdis of the second switching period can be detected by the control logic 104. For example, the fixed ratio can be 0.8, and the control logic 104 can adjust the second ON duration Wl31 in the current switching period to 0.8 times the discharge period Tdis in the previous switching period.

In some embodiments, the control logic 104 may set an initial second ON duration. During the first switching period, the control logic 104 may control the main switch driver 100 and the resonant zero-voltage switch driver 102 to turn off the main switch 120 and the resonant zero-voltage switch 122 after the initial second ON duration, and determine the discharge period of the first switching period based on the knee point of the feedback voltage Vfb. As shown in FIG. 3, the knee point may be any time point at which the feedback voltage Vfb starts to decrease and deviate from a platform voltage Vp, such as time points t4 and t5. The platform voltage Vp may be the clamp voltage of the feedback voltage Vfb after the start of the first pulse, for example, 10V. In some embodiments, at the end of the initial second ON duration, the feedback voltage Vfb will deviate from the platform voltage to generate a first knee point of the feedback voltage Vfb. At the end of the discharge period, the feedback voltage Vfb will again deviate from the platform voltage to generate a second knee point of the feedback voltage Vfb. The first knee point may correspond to the end of the second ON duration Wl31, and the second knee point of the feedback voltage Vfb may correspond to the end of the discharge period Tdis. The control logic 104 may calculate the time difference between the second knee point and the start time of the initial second ON duration as an updated discharge period of the first switching period, and adjust the second ON duration Wl31 of the second switching period accordingly. In some embodiments, if the second knee point of the feedback voltage Vfb cannot be detected after the end of the initial second ON duration, the control logic 104 may shorten the initial second ON duration until the second knee point may be detected.

In step S206, the control logic 104 adjusts the second OFF duration Td2 based on at least the feedback voltage Vfb. In some embodiments, the secondary side provides a compensation signal based on the load 16 or the output voltage Vout. After receiving the compensation signal, the control logic 104 may determine the operating frequency for switching the main switch 120 and the resonant zero-voltage switch 122 or determine the corresponding switching period duration Fmax (which is approximately equal to the inverse of the operating frequency), so that the output voltage Vout approaches the target voltage value. The control logic 104 may also count the peaks of the feedback voltage Vfb during the first switching period to generate a count value. In the second switching period, the control logic 104 selects one of resonant peaks of the feedback voltage Vfb according to the count value, the discharge period, and the operating frequency. The control logic 104 terminates the second OFF duration Td2 and starts the third ON duration at the time point when the selected resonant peak occurs. The selected resonant peak is corresponding to the operating frequency. In some embodiments, the selected resonant peak may be the resonant peak following the end of the switching period duration Fmax within the switching period Tsw. For example, as shown in FIG. 3, the control logic 104 starts counting the switching period duration Fmax from the time point t1 at the start of the first ON duration. The switching period duration Fmax ends between at time point t7. Thus, at time point t8 where the selected resonant peak appears after the end of the switching period duration Fmax, the second OFF duration Td2 ends and the third ON duration starts.

In Taiwan patent application No. TW202135442A, a modulation control method for active clamped flyback (ACF) power converters is disclosed. This method may determine when to generate a second active clamp switch signal QH2 to assist in ZVS switching according to the peak count value in a previous period, an equivalent secondary side current discharge period, and an operating frequency signal. Another possible implementation of step S206 of the control method in FIG. 2, which describes when to terminate the second OFF duration Td2 and start the third ON duration (the second pulse Pl32) in the next switching period, can be found in the published implementation details for generating the second active clamp switch signal QH2 in the Taiwanese patent application No. TW202135442A.

In step S208, the second ON duration may be equal to the pulse width of the second pulse, such as the pulse width Wl32 of the second pulse Pl32 in FIG. 3. There is a negative relationship between the length of the third ON duration and the current Ihb. The current Ihb becomes more negative as the third ON duration lengthens.

Taiwan patent application No. TW202135452A discloses a modulation control method for active clamped flyback (ACF) power converters. This method discloses a control method that may automatically adjust a turn-on time TONH of an active clamp switch QQH to assist the power converter to perform ZVS when a main switch QQL is turned on again. For step S208 of the method in FIG. 2, possible implementations for adjusting the third ON duration (Pl32) in the next switching period can be found in the implementation details disclosed in the Taiwanese patent application TW202135452A: According to the comparison result between a first sampling value (related to a peak value PEAK of an auxiliary winding current during a resonant period) and a third sampling value (related to a current value of the auxiliary winding current when a primary side main switch is turned on), the turn-on time TONH of the active clamp switch QQH is adjusted to assist the main switch QQL to perform ZVS.

In step S210, during the third OFF duration Td3, the negative current Ihb may raise the voltage Vhb of the coupling node close to the input voltage Vin. This helps to reduce the voltage difference between the two ends of the main switch 120, which in turn helps the main switch 120 to achieve zero-voltage switching when it is turned on again. After the third OFF duration Td3 ends, the method returns to step S200.

The Taiwan patent application No. TW202135452A not only discloses the modulation control method for active clamped flyback power converters, but also discloses a control method that may automatically adjust a dead time TDEAD between the turn-on times of the active clamp switch QQH and the main switch QQL. This helps the main switch QQL to perform ZVS when it is turned on again. For step S210 of the method in FIG. 2, a possible implementation for adjusting the third OFF duration Td3 of the next switching period can refer to the implementation details disclosed in the Taiwan TW202135452A patent application: The dead time TDEAD between the conduction times of the active clamp switch QQH and the main switch QQL is adjusted according to the comparison result of the first sampling value (related to a peak value PEAK of an auxiliary winding current during a resonant period) and the second sampling value (related to the current value of the auxiliary winding current just before the main switch is turned on).

In the embodiment, the control logic 104 (1) determines the pulse width Wh31 of the main pulse Ph31 according to the ratio of the required output voltage Vout to the current input voltage Vin, (2) determines the pulse width Wl31 of the first pulse Pl31 according to the discharge period in the previous switching period, (3) starts to generate the second pulse when the next resonant peak of the feedback voltage Vfb appears after the end of the switching period duration Fmax, (4) determines the third ON duration (Pl32) according to two sampling values of the auxiliary winding current, and (5) determines the third OFF duration Td3 according to two other sampling values of the auxiliary winding current. Therefore, the start times and widths of the main pulse, the first pulse, and the second pulse are all independently controlled, and the control mechanism is simple. Under light-loading conditions, most of the resonant energy is transferred and the main switch 120 undergoes zero-voltage switching, improving energy transfer efficiency.

FIG. 3 is a waveform diagram of the AHB converter system 1 in FIG. 1 under a light-loading condition. The horizontal axis represents time and the vertical axis represents voltage or current. The switching period Tsw includes the main pulse Ph31, the first pulse Pl31, and the second pulse Pl32.

Before time point t1, due to the pulse with W132 occurred in the third ON duration of the previous switching period, the voltage Vhb rises to approach the input voltage Vin, the feedback voltage Vfb drops to approach the ground voltage, and the output current Io is 0 A. At time point t1, the main pulse Ph31 and the switching period duration Fmax start. At time point t2, the main pulse Ph31 ends. The period between time points t1 and t2 can be referred to as the first ON duration. Between time points t1 and t2, the current Ihb and the magnetization current Im linearly increase to store energy in the primary winding W1, the voltage Vhb is kept at the input voltage Vin, the feedback voltage Vfb is kept at the ground voltage, and the output current Io stays at 0 A.

Between time points t2 and t3, the voltage Vhb drops to approach the ground voltage, and the feedback voltage Vfb rises to approach the platform voltage Vp. At time point t3, the first pulse Pl31 starts, and at time point t4, the first pulse Pl31 ends. The period between time points t2 and t3 can be referred to as the first OFF duration. The period between time points t3 and t4 can be referred to as the second ON duration. Between time points t3 and t4, the current Ihb resonates, the magnetization current Im linearly decreases to transfer energy to the secondary side, the voltage Vhb is kept at the ground voltage, the feedback voltage Vfb is kept at the platform voltage Vp, and the output current Io starts to resonate and exceeds 0 A. At time point t4, the first pulse Pl31 ends, causing the resonant zero-voltage switch 122 to turn off, the current Ihb returns to 0 A, the output current Io returns to 0 A, the feedback voltage Vfb briefly falls from the platform voltage Vp, thus causing the first knee point of the feedback voltage Vfb.

Between time points t4 and t5, the current Ihb remains at 0 A, but the magnetization current Im is still greater than 0 A, so the feedback voltage Vfb rises back to the platform voltage Vp. At time point t5, the magnetization current Im continues decreasing linearly, the second knee point of the feedback voltage Vfb occurs, and the discharge period Tdis ends. The period between time points t3 and t5 can be referred to as the discharge period Tdis.

In the embodiment, a first peak of the feedback voltage Vfb occurs at time point t6. The switching period duration Fmax ends at time point t7. A second peak of the feedback voltage Vfb occurs at time point t8. The period between time points t1 and t7 can be referred to as the switching period duration Fmax of the first switching period Tsw. At time point t8 when the next peak appears after the end of the switching period duration Fmax, the second OFF duration Td2 ends and the third ON duration starts, that is, the start of the second pulse Pl32 is triggered.

At time point t8, the voltage Vhb drops to the ground voltage, and the feedback voltage Vfb rises to the platform voltage Vp. The second pulse Pl32 starts at time point t8. The period between time points t4 and t8 can be referred to as the second OFF duration Td2. The period between time points t8 and t9 can be referred to as the third ON duration. Between time points t8 and t9, the current Ihb and the magnetization current Im decrease from 0 A to negative values, the voltage Vhb is kept at the ground voltage, and the feedback voltage Vfb is kept at the platform voltage Vp.

The period between time points t9 and t10 can be referred to as the third OFF duration Td3. Between time points t9 and t10, the negative current Ihb and the magnetization current Im pull the voltage Vhb up, approaching the input voltage Vin. This facilitates zero-voltage switching of the main switch 120 when it turns on again at time point t10. The main pulse Ph32 starts at time point t10, once again storing energy in the primary winding W1.

Figure 4:
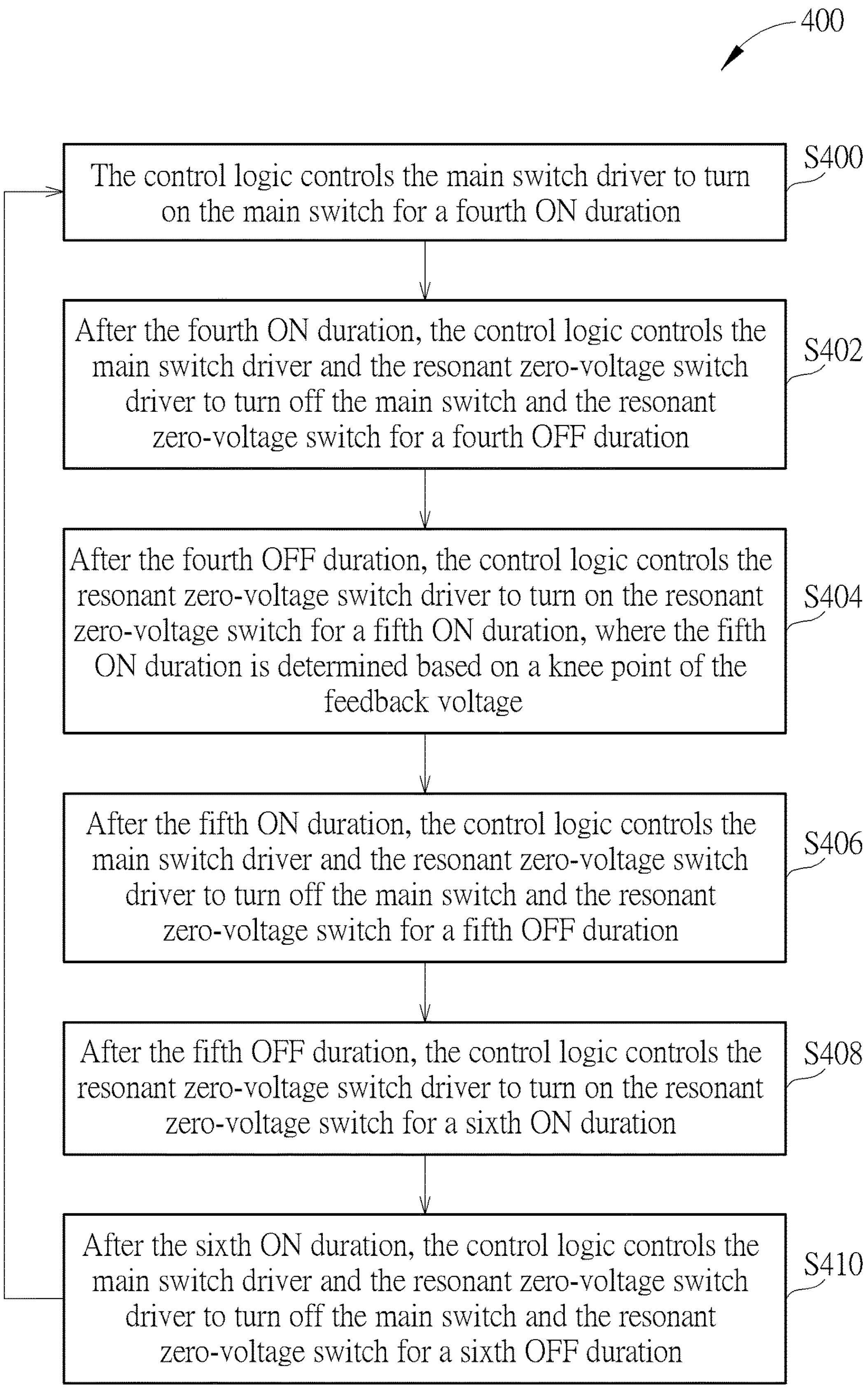
FIG. 4 is a flow chart of another method for operating the controller in FIG. 1.

FIG. 4 is a flow chart of another operation method 400 of the AHB converter system 1, suitable for heavy-loading conditions. For example, in the previous switching period, if the switching period duration Fmax has ended before the second knee point corresponding to the end of the discharge period Tdis occurs, then the end of a fifth OFF duration of the next switching period would be adjusted accordingly. The operation method 400 includes steps S400 to S410, forming the switching period of the AHB converter 12. Steps S400 and S402 are used to generate the main pulse, steps S404 and S406 are used to generate the first pulse, and steps S408 and S410 are used to generate the second pulse. Any reasonable technical modifications or adjustments to the steps fall within the scope disclosed by the invention. The explanations for steps S400 to S410 are as follows:

Step S400: The main switch driver 100 is controlled to turn on the main switch 120 for a fourth ON duration;

Step S402: The control logic 104 ends the fourth ON duration and starts a fourth OFF duration. The control logic 104 controls the main switch driver 100 and the resonant zero-voltage switch driver 102 to turn off the main switch 120 and the resonant zero-voltage switch 122;

Step S404: The control logic 104 ends the fourth OFF duration and starts a fifth ON duration. The control logic 104 controls the resonant zero-voltage switch driver 102 to turn on the resonant zero-voltage switch 122. The control logic 104 may determine the length of the fifth ON duration in the current switching period according to the discharge period Tdis in the previous switching period. For example, the fifth ON duration in the current switching period is a fixed ratio of 0.8 of the discharge period Tdis in the previous switching period. The fifth ON duration is started when the resonant zero-voltage switch 122 is turned on, and the resonant zero-voltage switch 122 is turned off when the fifth ON duration reaches the length determined by the control logic 104;

Step S406: The control logic 104 ends the fifth ON duration and starts a fifth OFF duration. The control logic 104 controls the main switch driver 100 and the resonant zero-voltage switch driver 102 to turn off the main switch 120 and the resonant zero-voltage switch 122. The control logic 104 may trigger the end of the fifth OFF duration at the end of the discharge period Tdis of the current switching period. For example, when the control logic 104 detects the second knee point of the feedback voltage corresponding to the end of the discharge period Tdis, it triggers the end of the fifth OFF duration;

Step S408: The control logic 104 ends the fifth OFF duration and starts a sixth ON duration. The control logic 104 controls the resonant zero-voltage switch driver 102 to turn on the resonant zero-voltage switch 122;

Step S410: After the sixth ON duration, the control logic 104 controls the main switch driver 100 and the resonant zero-voltage switch driver 102 to turn off the main switch 120 and the resonant zero-voltage switch 122 for a sixth OFF duration, then returns to step S400.

Steps S400 to S404 and S410 are similar to steps S200 to S204 and S210, respectively. Therefore, they are not repeated here.

If the control logic 104 detects that the current load has changed from light-loading to heavy-loading, and wants to switch from the light-loading mode flow (i.e., the operation method 200) as illustrated in FIG. 2 to the heavy-loading mode flow (i.e., the operation method 400) as illustrated in FIG. 4, step S206 may be still executed in the current switching period and step S406 would be executed in the next switching period since the instruction cycle of the control logic 104 is slower.

Figure 5:
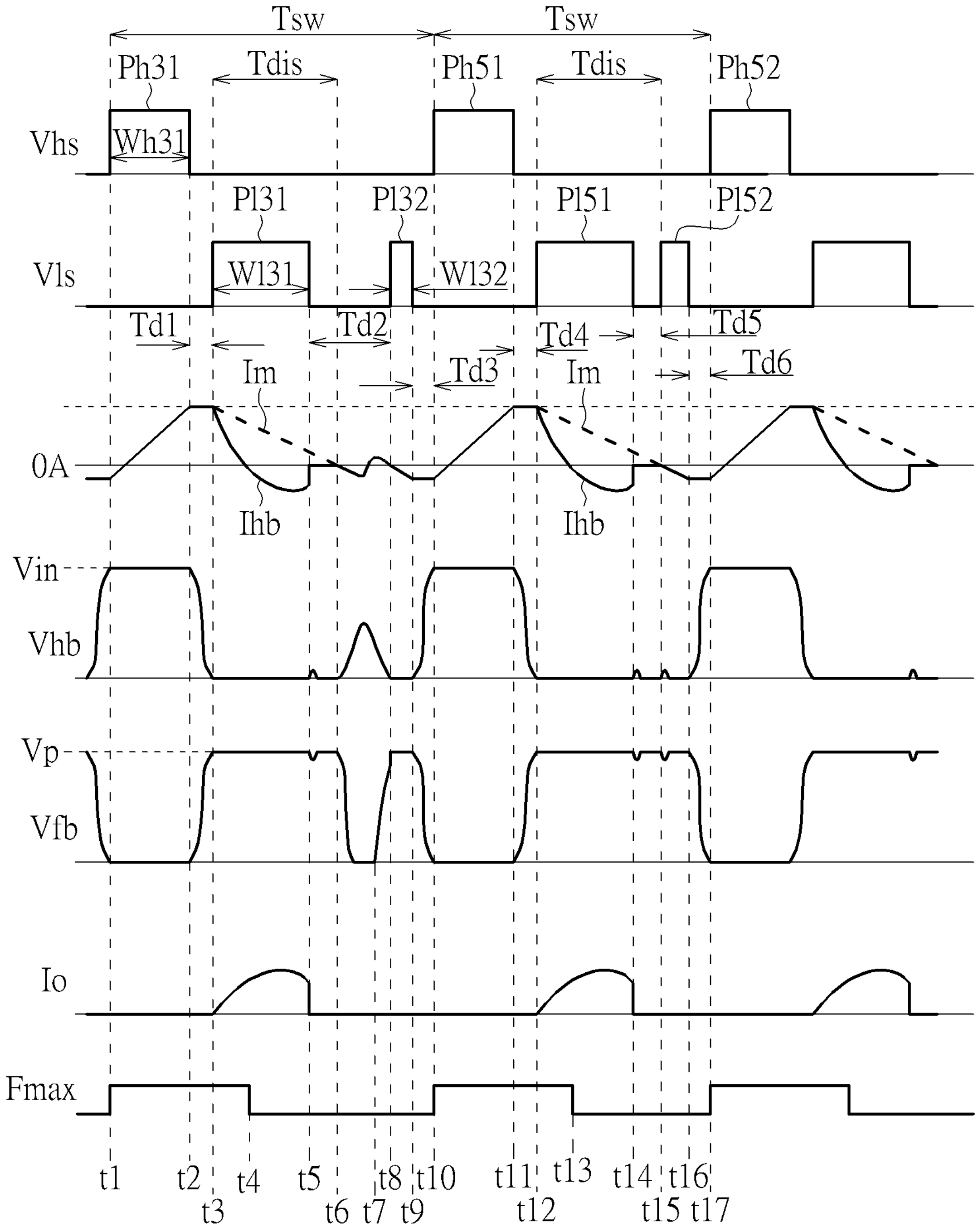
FIG. 5 is a waveform diagram of the asymmetric half-bridge converter system in FIG. 1 under a heavy-loading condition.

For example, if the AHB converter 12 was in the light-loading condition in the previous switching period (i.e, the first switching period) and the operation method 200 was being executed, as shown on the left side of FIG. 5, if the control logic 104 detects that the current switching period duration Fmax has switched for the heavy-loading condition (i.e., the control logic 104 detects that the current switching period duration Fmax of the first switching period has ended before the second knee point of the feedback voltage Vfb corresponding to the end of the discharge period Tdis). Therefore: (1) as shown on the left side of FIG. 5, the control logic 104 still executes the operation method 200 for the light-loading condition during the first switching period, and terminates the second OFF duration Td2 and starts the third ON duration Pl32 (steps S206 to S208) when a first peak of the feedback voltage Vfb occurs at time point t8 after the end of the switching period duration Fmax; and (2) as shown in the middle of FIG. 5, the control logic 104 executes the operation method 400 for the heavy-loading condition in the second switching period, and terminates the fifth OFF duration Td5 and starts the sixth OB duration Pl52 (steps S406 to S408) at the second knee point of the of the feedback voltage Vfb corresponding to the end of the discharge period Tdis (i.e, time point t15).

In the embodiment, due to the independent control of the main pulse, the first pulse, and the second pulse, the control mechanism is simple, and most of the resonant energy transfer and zero-voltage switching of the main switch 120 are achieved in the heavy-loading condition, which improves the energy transfer efficiency.

FIG. 5 is a waveform diagram showing the AHB converter system 1 switching from a light-loading condition to a heavy-loading condition. The horizontal axis represents time, and the vertical axis represents voltage or current. One of the switching periods Tsw comprises a main pulse Ph51, a first pulse Pl51, and a second pulse Pl52. The left side of FIG. 5 shows the earlier first switching period Tsw, where the AHB converter system 1 is in a light-loading condition and operates using the operation method 200. The middle of FIG. 5 shows the later second switching period Tsw, where the AHB converter system 1 is in a heavy-loading condition and operates using the operation method 400.

Before time point t1, due to the pulse with W132 occurred in the third ON duration of the previous switching period, the voltage Vhb rises to approach the input voltage Vin, the feedback voltage Vfb drops to approach the ground voltage, and the output current Io is 0 A. At time point t1, the main pulse Ph31 of the first switching period Tsw starts, and the switching period duration Fmax starts. At time point t2, the main pulse Ph31 ends. The period between time points t1 and t2 can be called the first ON duration. Between time points t1 and t2, the current Ihb and the magnetization current Im rise linearly to store energy in the primary winding W1, the voltage Vhb is kept at the input voltage Vin, the feedback voltage Vfb is kept at the ground voltage, and the output current Io stays at 0 A.

Between time points t2 and t3, the voltage Vhb drops to approach the ground voltage, and the feedback voltage Vfb rises to approach the platform voltage Vp. At time point t3, the first pulse Pl31 of the first switching period Tsw starts. At time point t4, the switching period duration Fmax of the first switching period Tsw ends. At time point t5, the first pulse Pl31 ends. The period between time points t2 and t3 may be called the first OFF duration Td1. The period between time points t3 and t5 may be called the second ON duration. The period between time points t1 and t4 may be called the switching period duration Fmax of the first switching period Tsw. Between time points t3 and t5, the current Ihb resonates, the magnetization current Im decreases linearly to transfer energy to the secondary side, the voltage Vhb is kept at ground voltage, the feedback voltage Vfb is kept at the platform voltage Vp, and the output current Io starts to resonate and exceeds 0 A. At time point t5, the first pulse Pl31 ends, causing the resonant zero-voltage switch 122 to turn off, the current Ihb and the output current Io return to 0 A, the feedback voltage Vfb falls from the platform voltage Vp, and the first knee point of the feedback voltage Vfb occurs. However, the magnetization current Im has not yet dropped to 0, so the feedback voltage Vfb will soon recover to the platform voltage Vp.

At time point t6, the magnetization current Im decreases to 0, the discharge period Tdis ends, and the feedback voltage Vfb again falls from the platform voltage Vp, resulting in the second knee point of the feedback voltage Vfb. Since the switching period duration Fmax ended before the end of the discharge period Tdis, the control logic 104 executes the operation method 400 for the heavy-loading condition in the later second switching period Tsw, but still executes step S206 in the current first switching period Tsw. Therefore, the control logic 104 controls the second pulse Pl32 of the first switching period Tsw to start at time point t8 when the first peak of the feedback voltage Vfb occurs. The period between time points t5 and t8 may be called the second OFF duration Td2. At time point t9, the second pulse Pl32 ends. The period between time points t8 and t9 may be called the third ON duration.

Between time points t9 and t10, the voltage Vhb rises to approach the input voltage Vin, and the feedback voltage Vfb drops to approach the ground voltage. At time point t10, the main pulse Ph51 of the second switching period Tsw starts, and the switching period duration Fmax starts. At time point t11, the main pulse Ph51 ends. The period between time points t9 and t10 may be called the third OFF duration Td3. The period between time points t10 and t11 may be called the fourth ON duration. Between time points t10 and t11, the current Ihb and the magnetization current Im increase linearly to store energy in the primary winding W1, the voltage Vhb is kept at the input voltage Vin, the feedback voltage Vfb is kept at ground voltage, and the output current Io stays at 0 A.

Between time points t11 and t12, the voltage Vhb drops to approach the ground voltage, and the feedback voltage Vfb rises to approach the platform voltage Vp. At time point t12, the first pulse Pl51 of the second switching period Tsw starts. At time point t13, the switching period duration Fmax ends. At time point t14, the first pulse Pl51 ends. The period between time points t11 and t12 may be called the fourth OFF duration Td4. The period between time points t12 and t14 may be called the fifth ON duration. The period between time points t10 and t13 may be called the switching period duration Fmax of the second switching period Tsw. Between time points t12 and t14, the current Ihb resonates, the magnetization current Im linearly decreases to transfer energy to the secondary side, the voltage Vhb is kept at ground voltage, the feedback voltage Vfb is kept at the platform voltage Vp, and the output current Io starts to resonate and exceeds 0 A. At time point t14, the first pulse Pl51 ends, causing the resonant zero-voltage switch 122 to turn off, the current Ihb returns to 0 A, the feedback voltage Vfb falls from the platform voltage Vp, and the first knee point of the feedback voltage Vfb occurs. However, the magnetization current Im has not yet decreased to 0, so the feedback voltage Vfb will soon recover to the platform voltage Vp.

At time point t15, the magnetization current Im decreases to 0, the discharge period Tdis ends, causing the second knee point of the feedback voltage Vfb. The period between time points t12 and t15 may be called the discharge period Tdis. The period between time points t14 and t15 may be called the fifth OFF duration Td5. The control logic 104, based on the detection results of the previous switching period, starts the second pulse Pl52 at time point t15, which corresponds to the second knee point at the end of the discharge period Tdis in the second switching period.

Figure 7:
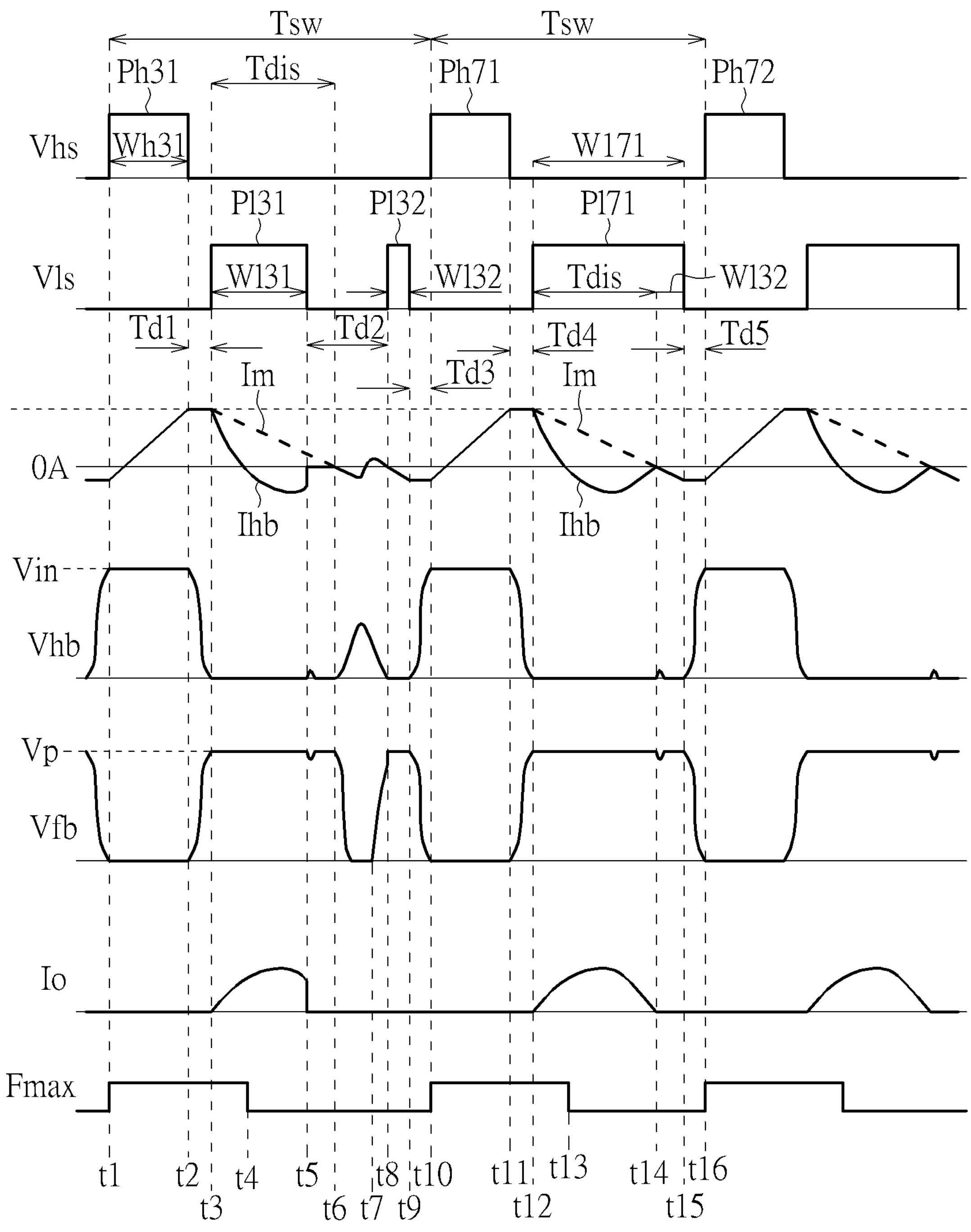
FIG. 7 is a waveform diagram of the asymmetric half-bridge converter system in FIG. 1 under another heavy-loading condition.

Additionally, because the switching period duration Fmax has already ended before time point t15 (when the discharge period Tdis of the second switching period ends and the second knee point occurs), the control logic 104 executes the operation method 400 for the heavy-loading condition in a subsequent third switching period Tsw shown in FIG. 7.

At time point t16, the second pulse Pl52 ends. The period between time points t15 and t16 may be called the sixth ON duration. Between time points t15 and t16, the current Ihb and magnetization current Im decrease from 0 A to negative values, the voltage Vhb rises from the ground voltage and then drops back to the ground voltage, and the feedback voltage Vfb drops from the platform voltage Vp and then rises back to the platform voltage Vp. Between time points t16 and t17, the voltage Vhb rises to approach the input voltage Vin, and the feedback voltage Vfb drops to approach the ground voltage.

At time point t17, the main pulse Ph52 starts, again storing energy in the primary winding W1. The period between time points t16 and t17 may be called the sixth OFF duration Td6. Between time points t16 and t17, the negative current Ihb and the magnetization current Im will pull up the voltage Vhb to approach the input voltage Vin, which will help the main switch 120 to achieve zero-voltage switching when it is turned on again at time point t17.

In the aforementioned embodiment, if the AHB converter system 1 operates in the light-loading mode shown in FIG. 2 during the previous switching period, but the end of the switching period duration Fmax is detected to be earlier than the end of the discharge time Tdis (as shown in the first switching period on the left side of FIG. 5), it will trigger the AHB converter system 1 to switch to the heavy-loading mode shown in FIG. 4 (as shown in the second switching period in the middle of FIG. 5). For another example, if the previous switching period operates in the heavy-loading mode as shown in FIG. 4 (as shown in the second switching period in the middle of FIG. 5), and the end of the switching period Fmax is detected to be earlier than the end of the discharge time Tdis, it will trigger the AHB converter system 1 to continue operating in the heavy-loading mode shown in FIG. 4 (as shown in the third switching period on the right side of FIG. 5).

In another embodiment, when a timing circuit within the control logic 104 operates at a faster calculation speed and can adjust the duration-related parameters in real-time based on the detection result, it can also immediately trigger the AHB converter system 1 to switch from the light-loading mode in FIG. 2 to the heavy-loading mode in FIG. 4 in the current switching period.

Figure 6:
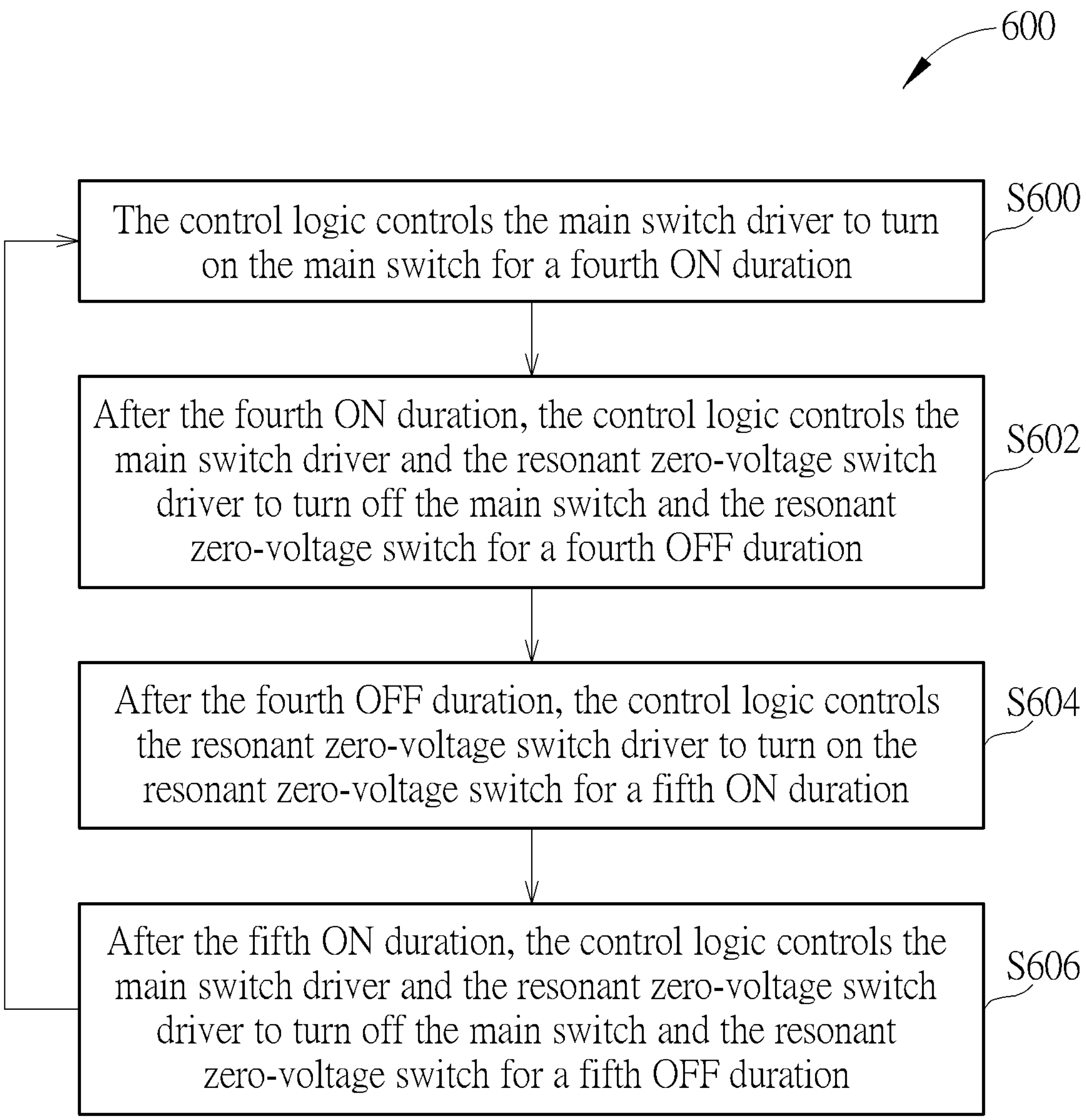
FIG. 6 is a flow chart of another method for operating the controller in FIG. 1.

FIG. 6 is a flow chart of another operation method 600 for the AHB converter system 1, suitable for heavy-loading conditions. The operation method 600 includes steps S600 to S606, forming the switching period of the AHB converter 12. Steps S600 and S602 are used to generate the main pulse, and steps S604 and S606 are used to generate the first pulse. Any reasonable technical modifications or adjustments to the steps fall within the scope disclosed by the invention. The explanations for steps S600 to S606 are as follows:

Step S600: The control logic 104 controls the main switch driver 100 to turn on the main switch 120 for a fourth ON duration;

Step S602: The control logic 104 terminates the fourth ON duration and starts the fourth OFF duration. The control logic 104 controls the main switch driver 100 and the resonant zero-voltage switch driver 102 to turn off the main switch 120 and the resonant zero-voltage switch 122;

Step S604: The control logic 104 terminates the fourth OFF duration and starts the fifth ON duration. The control logic 104 controls the resonant zero-voltage switch driver 102 to turn on the resonant zero-voltage switch 122. The control logic 104 can determine the length of the fifth ON duration in the current switching period based on the discharge period Tdis and the pulse width Wl32 under the light-loading condition. The fifth ON duration is started when the resonant zero-voltage switch 122 is turned on, and the resonant zero-voltage switch 122 is turned off when the fifth ON duration reaches the length determined by the control logic 104;

Step S606: The control logic 104 terminates the fifth ON duration and starts the fifth OFF duration. The control logic 104 controls the main switch driver 100 and the resonant zero-voltage switch driver 102 to turn off the main switch 120 and the resonant zero-voltage switch 122; then return to step S600.

Steps S600, S602, and S606 are similar to steps S200, S202, and S210, respectively, and are not further elaborated here.

In step S604, the fifth duration may be equal to a sum of the discharge period Tdis and the third duration under the light-loading condition. In the case of a heavy load (for example, in the previous switching period, the switching period duration Fmax has ended before the second knee point corresponding to the end of the discharge period Tdis occurs), the length of the fifth ON duration is extended to the sum of the discharge period Tdis and the pulse width Wl32 under the light-loading condition. This means that the resonant zero-voltage switch 122 is only turned on and off once in the next switching period, shortening the total time required for the entire switching period, allowing the AHB converter system 1 to switch at a higher frequency. Therefore, the fifth ON duration of the operation method 600 can be equal to the sum of the discharge period Tdis and the third duration under the light-loading condition, in order to achieve resonant energy transfer and generate the negative current required for zero-voltage switching during the fifth ON duration.

In the embodiment, due to the independent control of the main pulse and the first pulse, the control mechanism is simple, and most of the resonant energy transfer and zero-voltage switching of the main switch 120 are achieved in the heavy-loading condition, which improves the energy transfer efficiency.

FIG. 7 displays another waveform diagram showing the AHB converter system 1 switching from a light-loading condition to a heavy-loading condition. The horizontal axis represents time, and the vertical axis represents voltage or current. One of the switching periods Tsw includes the main pulse Ph71 and the first pulse Pl71. The left side of FIG. 7 shows an earlier first switching period Tsw, where the AHB converter system 1 is in a light-loading condition and operates using the operation method 200. The middle of FIG. 7 shows a later second switching period Tsw, where the AHB converter system 1 is in a heavy-loading condition and operates using the operation method 600. The first switching period Tsw in FIG. 7 is the same as that in FIG. 5, and its explanation can be found in the previous sections, so it will not be elaborated on here. The following provides a detailed explanation of the second switching period Tsw in FIG. 7.

At time point t6, the magnetization current Im drops to 0, the discharge period Tdis ends, and the feedback voltage Vfb falls from the platform voltage Vp again, thus the second knee point occurs of the feedback voltage Vfb. Since the switching period duration Fmax ends before the end of the discharge period Tdis in the previous switching period, the control logic 104 executes the operation method 400 for the heavy-loading condition in the later second switching period Tsw, but still executes step S206 in the current first switching period Tsw. Therefore, the control logic 104 controls the second pulse Pl32 of the first switching period Tsw to start at time point t8 when the first peak of the feedback voltage Vfb occurs.

Between time points t9 and t10, the voltage Vhb rises to approach the input voltage Vin, and the feedback voltage Vfb drops to approach the ground voltage. At time point t10, the main pulse Ph71 of the first switching period starts, and the switching period duration Fmax starts. The main pulse Ph71 ends at time point t11. The period between time points t10 and t11 can be called the fourth ON duration. Between time points t10 and t11, the current Ihb and the magnetization current Im linearly increase to store energy in the primary winding W1, the voltage Vhb is kept at the input voltage Vin, the feedback voltage Vfb is kept at the ground voltage, and the output current Io stays at 0 A.

Between time points t11 and t12, the voltage Vhb drops to approach the ground voltage, and the feedback voltage Vfb rises to approach the platform voltage Vp. Based on the detection results of the previous switching period, the control logic 104 sets the pulse width Wl71 of the first pulse Pl71 in the second switching period to be equal to the sum of the discharge period Tdis of the first switching period and the pulse width Wl32 of the second pulse Pl32. During the period corresponding to the first pulse Pl71 (between time points t12 and t15), the current Ihb undergoes a complete resonance and the magnetization current Im linearly decreases to transfer energy to the secondary side, the voltage Vhb is kept at the ground voltage, the feedback voltage Vfb is kept at the platform voltage Vp, and the output current Io undergoes a complete resonance. Between time points t14 and t15, the current Ihb and the magnetization current Im decrease from 0 A to negative values, the voltage Vhb rises from the ground voltage and then drops back to the ground voltage, the feedback voltage Vfb drops from the platform voltage Vp and then rises back to the platform voltage Vp, and the output current Io remains at 0 A.

Because the end time point t13 of the switching period duration Fmax of the second switching period Tsw is earlier than the occurrence time point t15 corresponding to the second knee point at the end of the discharge period Tdis, the control logic 104 continues executing the operation method 600 shown in FIG. 6 for the heavy-loading condition in the later third switching period Tsw shown in FIG. 7.

At time point t16, the main pulse Ph72 starts, once again storing energy in the primary winding W1. The period between time points t15 and t16 can be called the fifth OFF duration Td5. Between time points t15 and t16, the negative current Ihb and the magnetization current Im pull the voltage Vhb up, approaching the input voltage Vin. This facilitates zero-voltage switching of the main switch 120 when it turns on again at time point t16.

In the embodiment, due to the independent control of the main switch 120 and the resonant zero-voltage switch 122, the control mechanism is simple, and most of the resonant energy transfer and zero-voltage switching of the main switch 120 are achieved in the heavy-loading condition, which improves the energy transfer efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for an asymmetrical half-bridge converter with a primary winding and an auxiliary winding formed on a primary side of the asymmetrical half-bridge converter, and a secondary winding formed on a secondary side, the auxiliary winding generating a feedback voltage, the controller comprising:

a first switch driver configured to drive a first switch of the asymmetrical half-bridge converter;

a second switch driver configured to drive a second switch of the asymmetrical half-bridge converter; and a control logic coupled to the first switch driver and the second switch driver, wherein during a first switching period and a second switching period, the control logic is configured to:

control the first switch driver to turn on the first switch for a first ON duration for the primary winding to store energy;

control the first switch driver and the second switch driver to turn off the first switch and the second switch for a first OFF duration after the first ON duration;

control the second switch driver to turn on the second switch for a second ON duration after the first OFF duration for transferring the energy stored in the primary winding to the secondary winding; and control the first switch driver and the second switch driver to turn off the first switch and the second switch for a second OFF duration after the second ON duration;

wherein during the first switching period, the control logic determines a discharge period according to a second knee point of the feedback voltage corresponding to an end of the discharge period, and the discharge period representing a time interval between a starting time point of the second ON duration and a time point of detecting the second knee point of the feedback voltage; and wherein during the second switching period, the control logic adjusts a length of the second ON duration to a fixed ratio of the discharge period, the fixed ratio being less than 1.

2. The controller of claim 1, wherein the fixed ratio is between 0.75 and 0.95.

3. The controller of claim 1, wherein during the second switching period, a first knee point is generated in the feedback voltage corresponding to an end of the second ON duration, and another second knee point is generated in the feedback voltage corresponding to an end of the discharge period; and during the second switching period, the another second OFF duration is ended at the second knee point of the feedback voltage.

4. The controller of claim 1, wherein during a third switching period when the asymmetrical half-bridge converter is in a heavy loading mode, the control logic is configured to:

control the first switch driver to turn on the first switch for a fourth ON duration;

control the first switch driver and the second switch driver to turn off the first switch and the second switch for a fourth OFF duration after the fourth ON duration;

control the second switch driver to turn on the second switch for a fifth ON duration after the fourth OFF duration;

control the first switch driver and the second switch driver to turn off the first switch and the second switch for a fifth OFF duration after the fifth ON duration; and if an end of a switching period duration is earlier than an end of the discharge period in the second switching period, during the third switching period, configure a length of the fifth ON duration to exceed a length of the discharge period.

5. The controller of claim 1, wherein the control logic is configured to:

control the second switch driver to turn on the second switch for a third ON duration after the second OFF duration; and control the first switch driver and the second switch driver to turn off the first switch and the second switch for a third OFF duration after the third ON duration.

6. A controller for an asymmetrical half-bridge converter, the asymmetrical half-bridge converter comprising an auxiliary winding formed on a primary side of the asymmetrical half-bridge converter, the auxiliary winding generating a feedback voltage, the controller comprising:

a first switch driver configured to drive a first switch of the asymmetrical half-bridge converter;

a second switch driver configured to drive a second switch of the asymmetrical half-bridge converter; and a control logic coupled to the first switch driver and the second switch driver, wherein during a first switching period and a second switching period and when the asymmetrical half-bridge converter is in a light-loading mode, the control logic is configured to:

control the first switch driver to turn on the first switch for a first ON duration;

control the first switch driver and the second switch driver to turn off the first switch and the second switch for a first OFF duration after the first ON duration;

control the second switch driver to turn on the second switch for a second ON duration after the first OFF duration; and control the first switch driver and the second switch driver to turn off the first switch and the second switch for a second OFF duration after the second ON duration;

wherein during the first switching period, the control logic determines a discharge period according to a second knee point of the feedback voltage, the second knee point of the feedback voltage corresponding to an end of the discharge period, and the discharge period representing a time interval between a starting time point of the second ON duration and a time point of detecting the second knee point of the feedback voltage; and during the second switching period, the control logic counts peaks of the feedback voltage to generate a count value, and based on the count value, the discharge period, and a switching period duration, the control logic selects one of the resonant peaks of the feedback voltage following an end of the switching period duration to terminate the second OFF duration.

7. The controller of claim 6, wherein the control logic is configured to:

control the second switch driver to turn on the second switch for a third ON duration after the second OFF duration; and control the first switch driver and the second switch driver to turn off the first switch and the second switch for a third OFF duration after the third ON duration.

8. The controller of claim 7, wherein:

the control logic determines a discharge period according to the feedback voltage during the first switching period, and ends the second ON duration and starts the second OFF duration before the discharge period ends in the second switching period; and during the second switching period, another second knee point is generated in the feedback voltage when the discharge period ends, and the another second OFF duration is ended and the third ON duration is started according to the second knee point.

9. The controller of claim 7, wherein during a third switching period and when the asymmetrical half-bridge converter is in a heavy loading mode, the control logic is configured to:

control the first switch driver to turn on the first switch for a fourth ON duration;

control the first switch driver and the second switch driver to turn off the first switch and the second switch for a fourth OFF duration after the fourth ON duration;

control the second switch driver to turn on the second switch for a fifth ON duration after the fourth OFF duration; and control the first switch driver and the second switch driver to turn off the first switch and the second switch for a fifth OFF duration after the fifth ON duration;

wherein during the second switching period, the control logic determines a discharge period according to the feedback voltage;

wherein in the third switching period, the control logic controls the fifth ON duration to be longer than the discharge period; and wherein in the third switching period, the fifth ON duration is used to assist the first switch in performing zero-voltage switching.

10. A method of operating an asymmetrical half-bridge converter, the asymmetrical half-bridge converter having a primary winding and an auxiliary winding formed on a primary side of the asymmetrical half-bridge converter, and a secondary winding formed on a secondary side of the asymmetrical half-bridge converter, the auxiliary winding generating a feedback voltage, a first switch driver driving a first switch of the asymmetrical half-bridge converter, and a second switch driver driving a second switch of the asymmetrical half-bridge converter, the method comprising:

during a first switching period and a second switching period, controlling the first switch driver to turn on the first switch for a first ON duration for the primary winding to store energy;

controlling the first switch driver and the second switch driver to turn off the first switch and the second switch for a first OFF duration after the first ON duration;

controlling the second switch driver to turn on the second switch for a second ON duration after the first OFF duration for transferring the energy stored in the primary winding to the secondary winding; and controlling the first switch driver and the second switch driver to turn off the first switch and the second switch for a second OFF duration after the second ON duration;

during the first switching period, determining a discharge period according to a second knee point of the feedback voltage corresponding to an end of the discharge period, wherein the discharge period represents a time interval between a starting time point of the second ON duration and a time point of detecting the second knee point of the feedback voltage; and during the second switching period, adjusting a length of the second ON duration to a fixed ratio of the discharge period to make the duration of the second ON duration shorter than a duration of the discharge period.

11. The method of claim 10, wherein the fixed ratio is between 0.75 and 0.95.

12. The method of claim 10, wherein during the first switching period, a first knee point is generated in the feedback voltage corresponding to an end of the second ON duration, and another second knee point is generated in feedback voltage corresponding to an end of the discharge period; and during the second switching period, at the another second knee point of the feedback voltage, the second OFF duration is ended.

13. The method of claim 10, wherein during a third switching period when the asymmetrical half-bridge converter is in a heavy loading mode, the control logic is configured to:

control the first switch driver to turn on the first switch for a fourth ON duration;

control the first switch driver and the second switch driver to turn off the first switch and the second switch for a fourth OFF duration after the fourth ON duration;

control the second switch driver to turn on the second switch for a fifth ON duration after the fourth OFF duration;

control the first switch driver and the second switch driver to turn off the first switch and the second switch for a fifth OFF duration after the fifth ON duration; and if an end of a switching period duration is earlier than an end of the discharge period during the second switching period, configure a length of the fifth ON duration to exceed a length of the discharge period during the third switching period.

14. The method of claim 10, further comprising:

during the first switching period and the second switching period, controlling the second switch driver to turn on the second switch for a third ON duration after the second OFF duration; and controlling the first switch driver and the second switch driver to turn off the first switch and the second switch for a third OFF duration after the third ON duration.

15. A method of operating a controller for an asymmetrical half-bridge converter, the asymmetrical half-bridge converter having an auxiliary winding on a primary side of the asymmetrical half-bridge converter, the auxiliary winding generating a feedback voltage, a first switch driver driving a first switch of the asymmetrical half-bridge converter, and a second switch driver driving a second switch of the asymmetrical half-bridge converter, the method comprising:

during a first switching period and a second ON duration when the asymmetrical half-bridge converter is in a light-loading mode, controlling the first switch driver to turn on the first switch for a first ON duration;

controlling the first switch driver and the second switch driver to turn off the first switch and the second switch for a first OFF duration after the first ON duration;

controlling the second switch driver to turn on the second switch for a second ON duration after the first OFF duration; and controlling the first switch driver and the second switch driver to turn off the first switch and the second switch for a second OFF duration after the second ON duration;

during the first switching period, determining a discharge period according to a second knee point of the feedback voltage, the second knee point of the feedback voltage corresponding to an end of the discharge period, and the discharge period representing a time interval between a starting time point of the second ON duration and a time point of detecting the second knee point of the feedback voltage; and during the second switching period, counting peaks of the feedback voltage to generate a count value, selecting a resonant peak of the feedback voltage following an end of a switching period duration according to the count value, the discharge period, and the switching period duration to terminate the second OFF duration.

16. The method of claim 15, further comprising:

during the first switching period and the second switching period, controlling the second switch driver to turn on the second switch for a third ON duration after the second OFF duration; and controlling the first switch driver and the second switch driver to turn off the first switch and the second switch for a third OFF duration after the third ON duration.

17. The method of claim 16, further comprising:

the control logic determining a discharge period according to the feedback voltage during the first switching period, the control logic terminating the second ON duration and starting the second OFF duration before the discharge period ends in the second\switching period; and when the discharge period ends in the second switching period, generating another second knee point in the feedback voltage, terminating the another second OFF duration and starting the third ON duration according to the second knee point.

18. The method of claim 16, further comprising:

during a third switching period and when the asymmetrical half-bridge converter is in a heavy loading mode, controlling the first switch driver to turn on the first switch for a fourth ON duration, controlling the first switch driver and the second switch driver to turn off the first switch and the second switch for a fourth OFF duration after the fourth ON duration, controlling the second switch driver to turn on the second switch for a fifth ON duration after the fourth OFF duration, and controlling the first switch driver and the second switch driver to turn off the first switch and the second switch for a fifth OFF duration after the fifth ON duration;

during the second switching period, determining a discharge period according to the feedback voltage;

in the third switching period, controlling the fifth ON duration to be longer than the discharge period; and in the third switching period, assisting the first switch in performing zero-voltage switching through turning on the second switch for the fifth ON duration in the second switching period.

* * * * *